MONOCHROMATIC LIGHT BEAM DEFLECTION APPARATUS HAVING TWO TRAINS OF FREQUENCY SCANNED ACOUSTIC WAVES FOR EFFECTING BRAGG DIFFRACTION

Filed June 17, 1968 3 Sheets-Sheet 1

Inventor
Robert Adler
By Francis W. Crotty
Attorney

Inventor
Robert Adler
By Francis W. Crotty
Attorney

MONOCHROMATIC LIGHT BEAM DEFLECTION APPARATUS HAVING TWO TRAINS OF FREQUENCY SCANNED ACOUSTIC WAVES FOR EFFECTING BRAGG DIFFRACTION

Filed June 17, 1968 3 Sheets-Sheet 3

Inventor
Robert Adler
By Francis W. Crotty
Attorney 3,531,184

MONOCHROMATIC LIGHT BEAM DEFLECTION APPARATUS HAVING TWO TRAINS OF FREQUENCY SCANNED ACOUSTIC WAVES FOR EFFECTING BRAGG DIFFRACTION

Robert Adler, Northfield, Ill., assignor to Zenith Radio Corporation, Chicago, Ill., a corporation of Delaware Continuation-in-part of application Ser. No. 476,797, Aug. 3, 1965. This application June 17, 1968, Ser. No. 737,492
Int. Cl. G02f 1/32
U.S. Cl. 350—161 15 Claims

ABSTRACT OF THE DISCLOSURE

A beam of light is diffracted, and thus deflected, by a train of acoustic waves the frequency of which is scanned throughout a range. By reason of the change in sound frequency across the width of the beam, the waves together exhibit a certain refractive power for the light. In one approach, such refraction is compensated by the disposition in the beam path of a lens exhibiting a complementary refractive power for the light. In another approach, the compensating lens effect is obtained by again diffracting the beam with a train of acoustic waves the frequency of which also is scanned throughout a range. The use of successive diffractions of the beam by a plurality of trains of such waves also is employed to multiply the angle of beam deflection while at the same time significantly increasing the image resolution of the system.

This application is a continuation-in-part of my copending application Ser. No. 476,797, filed Aug. 3, 1965, and assigned to the same assignee. The latter, in turn, is a continuation-in-part of my then copending earlier application Ser. No. 388,589, now U.S. Pat No. 3,431,504, filed Aug. 10, 1964, and also assigned to the same assignee. As in those cases, the present application pertains generally to signal transmitting apparatus and more particularly relates to systems and apparatus in which sound and light are caused to interact and in which the light is deflected by virtue of that interaction. As used herein, the terms "light" and "sound" are most general. That is, "light" embraces ordinarily visible electromagnetic waves as well as wave energy at wavelengths above or below the visible portion of the spectrum. The term "sound" (and "acoustic") also refers to propagating wave energy and includes not only that in the audible range but wave energy up to and including, for example, the microwave frequencies.

In the aforementioned earlier application, Ser. No. 476,797, light waves are caused to be diffracted by sound waves, as a result of which the light waves are deflected to a particular angle or angles depending upon the frequency characteristics of the sound waves. The sound waves are modulated either in amplitude or frequency depending upon the particular application. One advantageous embodiment described in that earlier application projects the sound wavefronts across the light wavefronts so that the angle in between is in accordance with the relationship of Bragg. With that angular relationship, the traveling sound waves act as if they were traveling mirrors, and, for a given frequency relationship, the angles of incidence and diffraction of the light are the same as is the case with an ordinary mirror. With planar sound and light wavefronts, useable Bragg angle reflection is attainable in such apparatus only over a limited range of sound frequency without adjustment of the relative beam positions to maintain the Bragg relationship. In contemplation of scanning the sound frequency over a wider range of frequencies, application Ser. No. 388,589 specifically embodies means for physically changing the relative orientation of the elements with changes in sound frequency. In terms of resolution available with the apparatus of that earlier application, limitations are found with respect to scanning speeds, practical ranges of needed sound frequencies and the maximum useful light beam aperture width.

It is a general object of the present invention to provide new and improved light-sound-interaction apparatus which permits the rapid scanning of a large number of resolvable points.

Another object of the present invention is to provide new and improved signal transmitting apparatus of the aforementioned character in which a wide light aperture width may be utilized.

A further object of the present invention is to provide new and improved signal transmitting apparatus of the light-sound interaction character in which image resolution is enhanced.

It is a still further object of the present invention to achieve the foregoing with apparatus featuring ease and practicability of construction to meet varied operational requirements.

Light deflection apparatus in accordance with the present invention includes means for producing a beam of substantially monochromatic light. A first train of acoustic waves is directed at an angle across the path of the beam so as to effect Bragg diffraction of the light in the beam. At the same time, a second train of acoustic waves also is directed at an angle across the path of the beam to effect a further Bragg diffraction of the same light. Finally, the apparatus includes means for repetitively scanning the frequency of the acoustic waves through respective frequency ranges mutually correlated in accordance with a predetermined function.

The features of the present invention which are believed to be novel are set forth with particularity in the appended claims. The organization and manner of operation of the invention, together with further objects and advantages thereof, may best be understood by reference to the following description taken in conjunction with the accompanying drawings, in the several figures of which like reference numerals identify like elements and in which:

Figure 1:
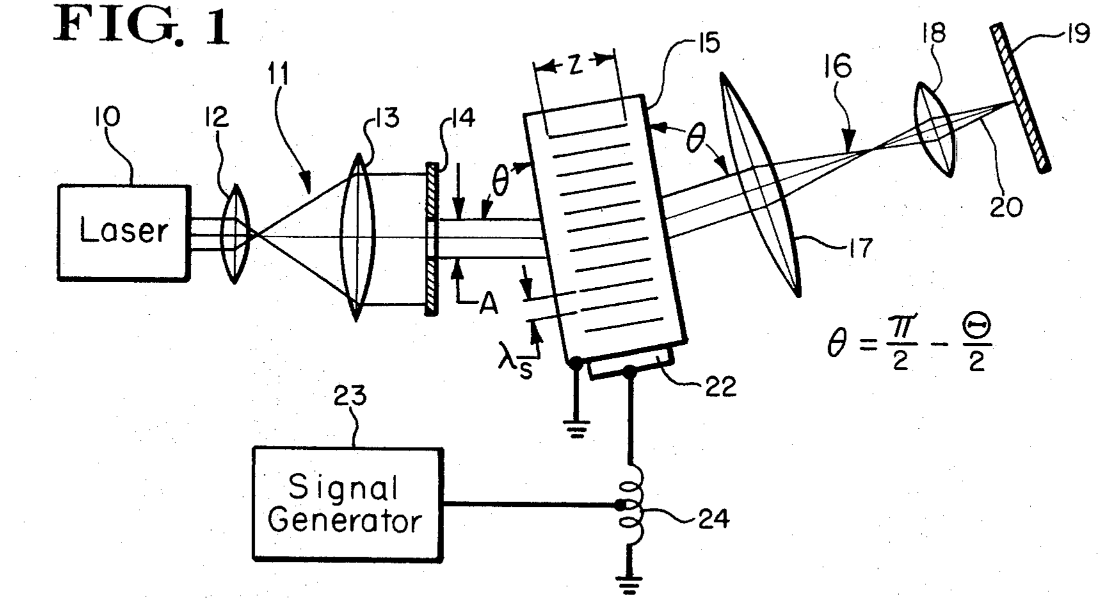
FIG. 1 is a schematic diagram of a light-sound signal translating apparatus.

The system of FIG. 1 is basically the same as that described and claimed in the aforementioned earlier application Ser. No. 476,797 and is included here to facilitate an understanding of the improvements disclosed and claimed in the present application. The apparatus includes a source 10 of preferably spatially coherent substantially monochromatic light, a magnifying telescope 11 having an eyepiece 12 and an object lens 13, a beam-limiting aperture-plate 14 with an aperture width A, a light-sound interaction cell 15, an inverted telescope 16 having an object lens 17 and an eyepiece 18, and, in this illustration, a light-responsive screen 19 across which light beam 20 is caused to be scanned by the apparatus. In one example, cell 15 is a container the walls of which are transmissive to the light waves and which is filled with water as a sound propagating medium. At one end of cell 15, coupled to the water, is a transducer 22 driven by electrical signals from a signal generator 23 suitably matched to transducer 22 by a transformer 24. As illustrated, transducer 22 generates planar, constant wavelength, wavefronts.

With the apparatus of FIG. 1, Bragg reflection is obtained when the light, of vacuum wavelength $\lambda$, travels in a stratified medium of spatial period $\Lambda$ between the stratifications and refractive coefficient $n$ through a path length Z such that:

$$Z \gg n\Lambda^2/\lambda$$

The diffracted light forms a diffraction angle $\Theta$ with the undiffracted light according to:

$$\sin\frac{\theta}{2} \cong \frac{1}{2}\frac{\lambda}{\Lambda} \qquad (2)$$

Where $\Theta$ is much less than 1, $\Theta=\lambda/\Lambda$. The Bragg angle may be defined in terms of the angle $\theta$ between the light and sound wave fronts; in that case the function in Equation 2 is more directly expresed in terms of cosine rather than sine. Since $\theta$ is the complement $\pi/2-\Theta/2$, the left-hand term in Equation 2 becomes cos $\theta$ in the angle between the propagation directions of the diffracted light and the sound beam. To obtain optimum intensity, the strata must be oriented like mirrors, symmetrical to the incident and diffracted light. However, that precise orientation effects only the intensity, not the direction of the diffracted light.

When the strata are generated by a sound wave of phase velocity $v$, the wavelength for an applied frequency $f$ is $\Lambda=v/f$ and the diffraction angle $\theta=\lambda f/v$. If the sound frequency is varied over a range $\Delta f$, the resulting scanning angle is $\Delta\Theta=\lambda(\Delta f)/v$.

The minimum angle which a projection system of aperture width A can resolve is $\Theta_{min.}=\lambda/A$. Dividing the scanning angle $\Delta\Theta$ by this minimum angle, the number N of resolvable spots is found to be:

$$N=\Delta\Theta/\Theta_{min.}=(\Delta f)A/v$$

A is the aperture width measured at approximately right angles to the sound wave fronts, i.e., along a direction of sound travel. It will be seen that $A/v$ is the transit time T of the sound waves across the aperture. Thus, $$N=(\Delta f)T$$

With the development of constant-frequency planar sound wave fronts in cell 15, optimum Bragg angle relationship is obtained by rotating cell 15 to the sound beam by $\frac{1}{2}\Delta\Theta(\pm\frac{1}{4}\Delta\Theta)$ as the diffracted light is scanned over the angle $\Delta\Theta$. To avoid the need for actual relative rotation, my copending application, Ser. No. 476,873, now U.S. Pat. No. 3,373,380, filed Aug. 3, 1965, and assigned to the same assignee, discloses apparatus in which the sound wave fronts are curved so that the tangents to the curve include a tangent which intersects the light wave fronts at the appropriate Bragg angle.

To afford a better understanding of the parameters involved in typical systems of the kind being discussed, it will be instructive to briefly describe typical operating parameters. Still referring to the overall system of FIG. 1, the change of sound frequency $\Delta f$, is chosen to be $5\times10^6$ cycles per second and aperture width A is 22 millimeters. Since the sound velocity $v$ in water is $1.5\times10^6$ millimeters per second, the transit time is of the order of 14.7 microseconds and the number of resolvable points N in accordance with the foregoing relationship is approximately 73. The 1.5-millimeter beam from a helium-neon laser operating at 6328 A is expanded to a width of about 30 millimeters by telescope 11 which has a magnification of 21. Aperture plate 14 allows a light beam width of 22 millimeters as the light enters cell 15. Transducer 22 is a quartz crystal 15 millimeters wide (making path length Z equal to 15 millimeters) and 3 millimeters high.

At the selected average or center frequency of 42.5 megacycles per second, the diffraction angle $\Theta$ is about 18 milliradians. Cell 15 is tilted by half this amount to obtain optimum Bragg reflection. In this arrangement, the selected parameters are $n=1.33$, $\Lambda=3.53\times10^{-2}$ millimeters, and $\lambda=6.33\times10^{-4}$ millimeters. Correspondingly, the value of $n\Lambda^2/\lambda$ is equal to 2.65 millimeters. A path length Z of 15 millimeters insures operation in the Bragg region. The electrical power applied at transducer 22 is 200 milliwatts; this is matched to the output of signal generator 23 by transformer 24 which is tuned in the range from 40 to 45 megacycles per second. The incident light is restricted by the rectangular aperture to 3 millimeters in height, so that no light can bypass the sound wave. The intensity of the diffracted light entering inverted telescope 16 is 8 db below that of the undiffracted light entering cell 15.

On leaving cell 15 the diffracted light projects through inverted telescope 16 which magnifies all angles 14.4 times. Consequently, the observed diffraction angle becomes $\Theta'$ which is of the order of 260 milliradians. Similarly, the scanning angle $\Delta\Theta$, which without inverted telescope 16 is computed to be about 2.11 milliradians corresponding to a frequency change $\Delta f$ of 5 megacycles per second, is increased to a value $\Delta\Theta'$ of 30.4 milliradians. Also by virtue of the inclusion of inverted telescope 16, the minimum resolvable angle is increased from $$\Theta_{min.}=\lambda/A$$

of 0.029 milliradian to a value of 0.415 milliradian.

It may be noted also for purposes of background information that the attenuation in water of sound in the 40-megacycle range is about 0.5 db/millimeter, or 11 db across the 22-millimeter aperture in the above-described system. When a light beam of uniform intensity and semi-infinite width traverses a sound wave of exponentially decreasing amplitude, the resolution of the diffracted light equals that which would be obtained with zero sound attenuation and a uniformly illuminated aperture $A_{eq.}$ Here, $A_{eq.}$ is the distance in which the sound power is attenuated by $2\pi$ nepers (27 db). In that system, $A_{eq.}$ is about 55 millimeters. Consequently, the resolution obtained is predominantly determined by the physical aperture. It is to be noted that a beam with a Gaussian intensity distribution suffers no loss of resolution. The effect of the exponential decay of sound amplitude across such a beam is merely that of displacing the center of the diffracted beam.

In another approach to the attainment of greater light beam deflection angles, as described in my copending application Ser. No. 476,798, now U.S. Pat. No. 3,419,322, filed Aug. 3, 1965, the sound waves are projected through a dispersive medium which causes the sound waves themselves to be diffracted at an angle which varies with change in the sound frequency. In one embodiment, a grating of spaced physical elements is utilized. It is constructed and oriented in a manner to redirect the sound waves with changes in frequency so as at least approximately to maintain the desired Bragg angle relationship between the sound waves and the light beam. That application also discloses arrangements for taking advantage of vibrational dispersion resulting in differences in angular relationships of sound propagating in various modes in different coupled media. The approaches yet to be described herein may be employed either by themselves in apparatus exemplified by the system in FIG. 1 or, alternatively, may be utilized to augment the available beam deflection in systems such as those heretofore mentioned which use curvature of the wave fronts or propagation of the sound through dispersive mediums.

In attempting to realize a scanning system as depicted in FIG. 1 which is to scan rapidly over a large number of resolvable points, one encounters a difficulty which, at first, appears to make the construction of such a system quite impractical. Because the frequency of the sound wave emanating from tranducer 22 changes rapidly during the scan, it appears necessary to restrict the opening of aperture A severely. If this were not done, the aperture would contain sound waves of different wavelengths which would then diffract the light simultaneously into different directions. In order not to lose resolution, the aperture should therefore be small enough so that the transit time of the sound wave across it corresponds to the time in which a single resolvable element is scanned.

How severe this restriction is is illustrated by using the numerical example previously referred to. The number of resolvable points N in that example was 73. Let it be assumed that all 73 points were to be scanned 15,000 times per second. The time available for each point is then 0.9 $\mu$sec.; a sound wave in water travels 1.35 mm. in that time, and the aperture A would thus have to be limited to 1.35 mm. instead of the 22 mm. described. Because, however, the number of resolvable points N equals the transit time T of the sound waves across the aperture multiplied by the range $\Delta f$ of sound frequency variation (Equation 4) the originally assumed number $N=73$ can be maintained, with the greatly reduced aperture, only if $\Delta f$ is increased from the original 5 mc./sec. to 82 mc./sec. In a system designed for a larger number N, the required frequency range $\Delta f$ would increase even further, greatly exceeding the capabilities of transducers and even the ability of a medium such as water to transmit sound at elevated frequencies.

According to the invention, it is possible to circumvent this difficulty and use a much larger aperture than one corresponding to the transit time for a single resolvable element, provided that the scan follows a linear law, so that the rate of change of the angle $\theta$ is constant with respect to time. In that case, if the aperture A is made wide, light diffracted at different points along the aperture emerges in different directions, but it has been found that these directions follow a simple law Specifically, the effect of the linear distribution of sound frequencies which exists across the aperture at any given moment is equivalent to superposition upon the deflection produced at the center of the aperture of a simple optical cylinder lens, having a refractive power or inverse focal length of $$\frac{1}{F}=\frac{\lambda}{v^2}\frac{df}{dt} \qquad (5)$$

where the $df/dt$ is the rate of change of the frequency applied to transducer 22. The cylinder lens effect can be removed if desired by a complementary lens. By utilizing these principles, the aperture A can be made so wide that the transit time T of a sound wave across A constitutes a significant fraction of the scan repetition period.

Figures 2, 3, 4:
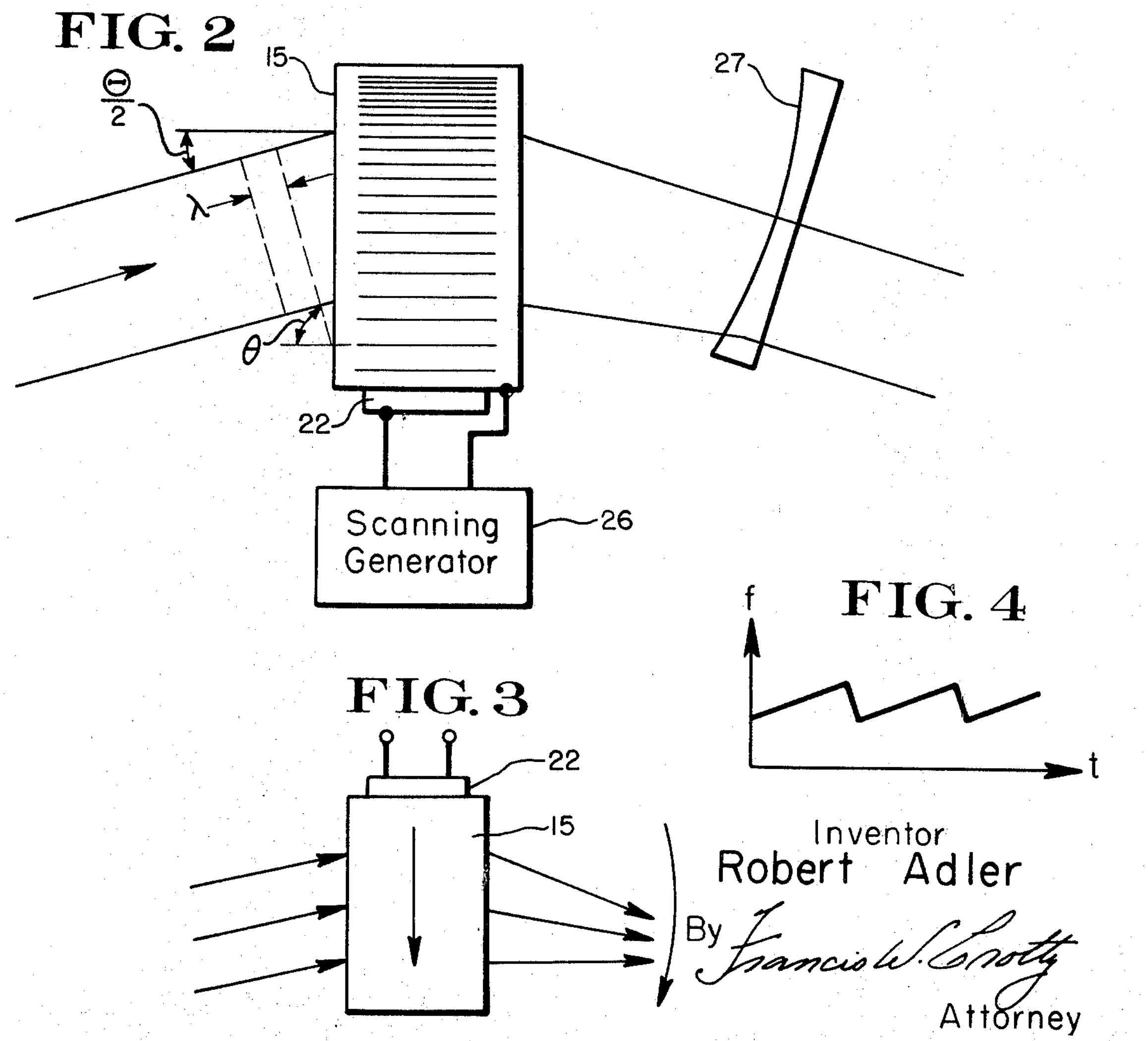
FIG. 2 is a schematic representation of an interaction element utilized in FIG. 1.
FIGS. 3, 5, 6 and 8 depict schematically various operational relationships of the interaction element depicted in FIG. 2.
FIGS. 4 and 7 are frequency-time graphs useful in understanding the operation of the apparatus depicted by others of the figures.

FIG. 2 illustrates a modification of a portion of the arrangement of FIG. 1 in which the light beam aperture width is such that the transit time T of the sound across the beam is a significant fraction of the repetition period of the scanned acoustic signals fed from a scanning generator 26. The presence of the sound waves whose frequency, at any given moment, varies linearly across the aperture causes the diffracted light either to converge or diverge as if it had passed through a cylindrical lens. The refractive power of this fictitious lens of cell 15 itself is proportional to the rate of change of frequency and thus stays constant throughout the linear scan. Allowance is made for this refractive power by means of compensating optical elements which may be additionally included in or external to cell 15.

As illustrated in FIG. 2, the sound wavelength is increasing with the passage of time during a scanning period and the approaching light wave fronts encounter departing sound wave fronts. Consequently, the light beam as it emerges from cell 15 converges astigmatically. This astigmatism is compensated by the imposition of a divergent cylindrical lens 27 in the emerging beam path. In practice, the cylindrically-divergent action of lens 27 may be included anywhere in the system, before, within or following cell 15.

To review the operation, the sound waves are directed across the light beam path in a manner such that one sound wave front traverses the width of the light beam in a predetermined time interval. Scanning generator 26 repetitively scans the frequency of the sound waves through a selected range of frequencies at such a rate that the aforementioned predetermined transit time interval is a significant fraction of one scanning period. To render the refractive power of the effective lens of cell 15 itself constant throughout the scan, the frequency change during a scanning period is linear so that its rate of change is constant. With the arrangement in FIG. 2, the wave fronts of the sound and light intersect approximately at the Bragg angle $\theta$ corresponding to the average sound and light frequencies. As indicated also in FIG. 2, the wavelength of the sound is small compared to the width of the light beam. Lens 27 is chosen so that its refractive power for the light is complementary to the refractive power of the sound waves. Alternatively, lens 27 may be selected to have a function of refraction with any desired relationship to the refractive function of cell 15 as determined by the scanning waveform.

In determining the properties of lens 27, for example whether it is to be a positive or negative lens, it is to be observed that a variety of different resulting beam deflection actions are available from cell 15, depending upon the specific angular relationships and wave propagating directions selected as illustrated in FIG. 3–8. The particular result achieved depends upon whether the sound waves are advancing toward or departing from the arriving light waves. Another selectable parameter is the choice between the use of a positive or negative Bragg angle, whether the light waves arrive from a direction from an angle to one side or the other of a normal to the direction of propagation of the sound waves. A still further choice lies between a scanning waveform in which frequency increases with time and one in which frequency decreases with time during the scanning period.

Figure 5:
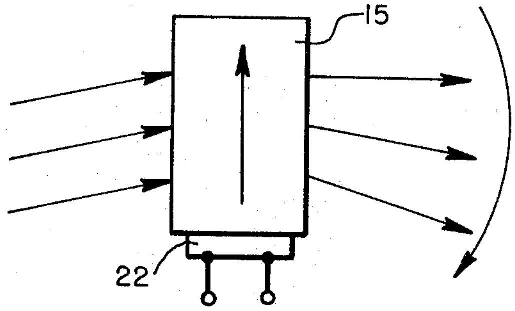

In both FIGS. 3 and 5, the sound frequency increases with the passage of time during each scanning period as depicted in FIG. 4. In FIG. 3, the light wave fronts encounter advancing sound wave fronts and the light diffracted by the sound waves is converged and deflected with a component of motion in the direction of sound wave propagation. The direction of motion is indicated in the drawing by the curved arrows. On the other hand, in FIG. 5 the light wave fronts encounter departing sound wave fornts as a result of which the light diffracted by the sound waves is diverged and deflected with a component of motion opposite to the direction of sound wave propagation.

Figure 6:
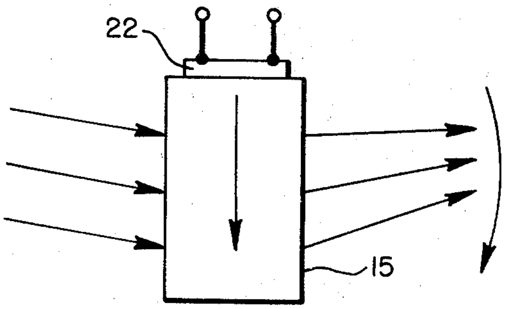
Figure 7:
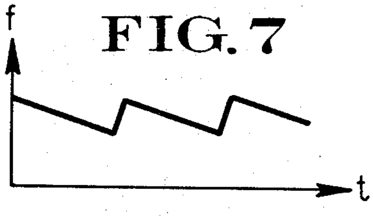
Figure 8:
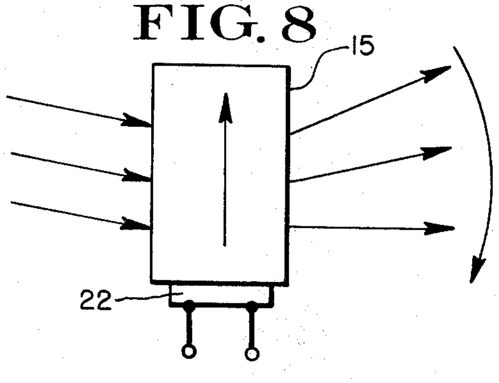

In the combinations of FIGS. 6 and 8, the sound frequency decreases with time during each scanning period as shown in FIG. 7. Consequently, in FIG. 6 the light wave fronts encounter departing sound wave fronts as a result of which light diffracted by the sound waves is converged and deflected with a component of motion in the direction of sound wave propagation. In FIG. 8 the light wave fronts encounter advancing sound wave fronts whereupon the light diffracted by the sound waves is diverged and deflected with a component of motion opposite to the direction of sound wave propagation.

It will be observed that in each of FIGS. 3, 5, 6 and 8 the direction of light beam deflection is the same with the arrangements as illustrated in the drawings. For deflection in the opposite direction during the scanning period, the systems simply are inverted.

Another approach to compensation of the inherent refractive action attributable to the light-sound cell itself, as explained in connection with FIGS. 2, 3, 5, 6 and 8, involves the utilization of a second light-sound interaction cell so arranged as to have a refractive power which is complementary to the refractive power of the first. That is, the compensating refractive means also directs sound waves across a portion of the path of the light beam and the frequency of both these sound waves changes across the width of the beam.

Figure 9:
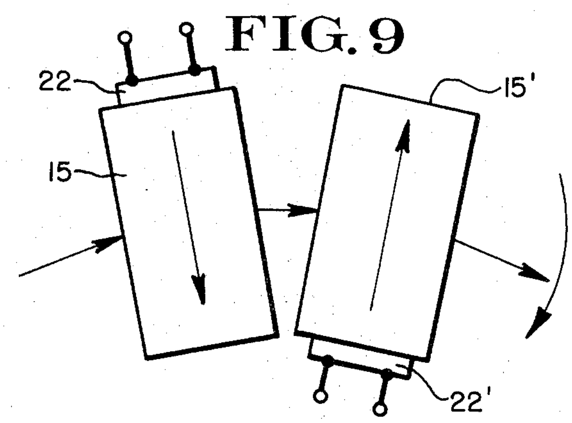
FIGS. 9, 10 and 11 are interaction arrangements alternative to that of FIG. 2 and featuring the present invention.

As illustrated in FIG. 9, both cells 15 and 15', spaced successively along the light beam path, are driven with sound signals the frequencies of which increase with time during the scanning period. However, the two cells individually are oriented so that the sound waves traverse the light beam in opposite directions. In this embodiment, the cells are oriented relative to one another so that the propagation directions of the sound waves form an angle approximately equal to twice the complement of the Bragg angle $\theta$ corresponding to the average frequency of the light and sound, or equal to twice the entrance angle $\Theta/2$ denoted in FIG. 2. In this case, the sound waves preferably are derived from a common scanning frequency source.

Figure 10:
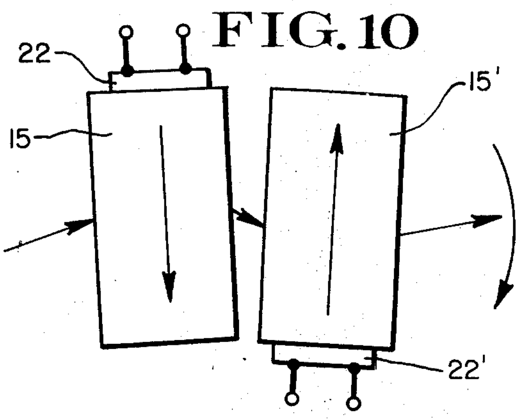

In the embodiment illustrated in FIG. 10, the transducer 22' driving the second or downstream cell 15' is driven by sound energy the frequency of which changes with the passage of time in a direction opposite that of the sound energy applied to the transducer of the other cell 15. Additionally, the sound waves individually traverse the light beam in opposite directions. In one arrangement, the propagation directions of the sound waves in the two different cells 15 and 15' are approximately parallel; this condition is most satisfactory when the respective frequencies driving the two different cells are sufficiently close so that they cross over during a scanning period.

Alternatively, when the frequency selection is such that the respective frequencies of the two sound waves do not cross over during scanning, one of the sound waves preferably is obtained from the other by a heterodyning process. With this arrangement, the lower-frequency one of the sound waves preferably is selected to traverse the light beam downstream from the other in order to take advantage of the greater tolerance of entrance angle attainable at lower frequencies. Also with this arrangement, the propagation direction of the sound waves are preferably oriented so as to form an angle in accordance with the Bragg relationship corresponding to the center frequencies of the respective frequency ranges over which the sound frequencies are scanned.

It will be observed that the combination in FIG. 9 is that of the cells individually depicted in FIGS. 3 and 5; a combination of the cells in FIGS. 6 and 8 would function in exactly the same manner. Similarly, FIG. 10 represents a combination of the individual transducers depicted in FIGS. 3 and 8 but the combination of FIGS. 6 and 5 would operate in the same way. With all of these combinations, the astigmatism created by the first cell is cancelled by the second, at least to a first order, and the resultant beam deflection is doubled.

Doubling the amount of beam deflection, or the scanning angle $\Delta\theta$, also results in doubling the number N of resolvable spots. As revealed by Equation 3, this occurs because both the aperture width A and the phase velocity $v$ remain the same in the illustrated systems wherein the physical dimensions involved are similar and the sound propagating media are alike. The effect of placing the two cells in series in the light beam is to add the $\Delta f$ contribution of each as expressed in Equation 4, again demonstrating a doubling of the number of resolvable spots.

Figure 11:
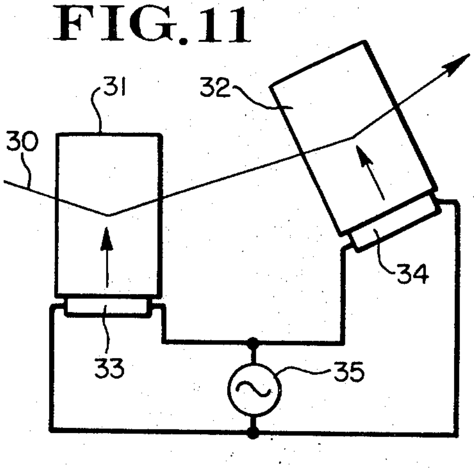

FIG. 11 illustrates a generally preferred arrangement of cascaded cells for use in increasing the resolution where the previously-described compensation of astigmatism is of no concern, as in the case of the image display system disclosed and claimed in the application of Adrianus Korpel, Ser. No. 600,430, filed Dec. 9, 1966, assigned to the same assignee, and wherein a plurality of successive picture elements are simultaneously imaged along the direction of sound travel in the light-sound interaction cell that deflects the light beam. In FIG. 11, light incoming along a beam path 30 is first deflected by a train of acoustic waves propagating in a cell 31 following which the light emerging from that cell is again deflected by a second train of acoustic waves propagating in a cell 32, so that the light beam thus is twice deflected. The acoustic waves are respectively developed by transducers 33 and 34 driven by a signal source 35. In this case, the transducers are coupled in common to source 35 so that the acoustic waves in both cells always are instantaneously of the same frequency and are repetitively scanned throughout the same range of frequencies.

Figure 12:
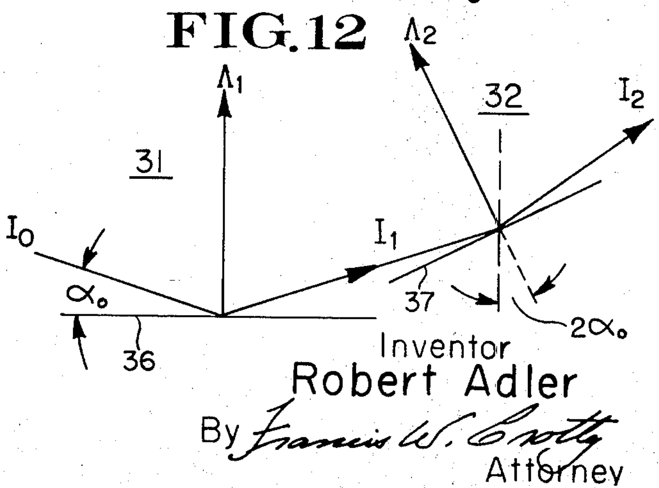
FIG. 12 is a diagram illustrating certain directional relationships pertaining to the species of FIG. 11.

The angular interrelationships are illustrated more clearly in FIG. 12. The light incident upon cell 31 approaches sound wave fronts 36 at the Bragg angle $\alpha_0$. The symbol $\alpha_0$ is used in connection with FIG. 12 and the following figures to simplify the expression of the angular relationships to be discussed; $\alpha_0$ is the some quantity as the angle $\theta/2$ depicted in FIG. 2 and previously utilized herein. Also, this quantity $\alpha_0$ is the Bragg angle as defined at the center of the frequency range through which the signals from source 35 are scanned.

Upon emerging from cell 31, wherein the sound waves of wavelength $\Lambda_1$ propagate in the direction indicated by the arrow bearing that symbol, the beam has been deflected so as to follow path $I_1$. This beam is then incident upon wave fronts 37 in cell 32 that propagate in the direction $\Lambda_2$. Upon again being diffracted by the acoustic waves in cell 32, the beam emerges from that cell along a still different path $I_2$. In order to obtain the proper angular relationships in cell 32 for Bragg diffraction while taking into account the change in direction of the light beam which occurs in cell 31, the two cells are mutually oriented so that the directions of sound wave propagation $\Lambda_1$ and acoustic wave propagation $\Lambda_2$ define an angle $2\alpha_0$ as indicated. This is the same angular relationship as was the case with the arrangement of FIG. 9, except that in the present case $\Lambda_2$ is inverted with respect to FIG. 9.

Figure 13:
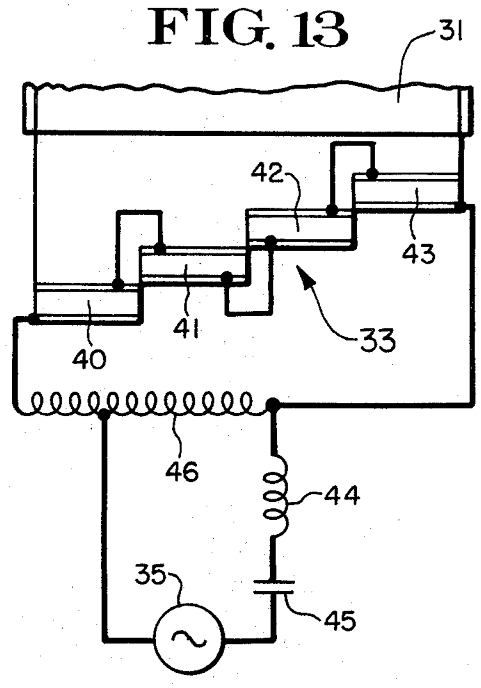
FIG. 13 is a schematic diagram of a transducer arrangement useful in the system of FIG. 11.

As previously indicated by reference to application Ser. No. 476,798, greater light beam deflection angles preferably are obtained by causing the direction of acoustic waves to change as the frequency changes; that is, the acoustic waves preferably are steered during the scanning interval so that the Bragg relationship is more closely maintained throughout the scanning range. A very attractive approach to that end is the arrangement illustrated in FIG. 13 wherein transducer 33 constitutes a phased array of individual transducers as fully described and claimed in my copending application Ser. No. 600,500 filed Dec. 9, 1966, and assigned to the same assignee, and as also described in detail in an article entitled, "A Television Display Using Acoustic Deflection and Modulation of Coherent Light," by Korpel, et al., which appeared in Applied Optics, volume 5, No. 10, pages 1667–1675, October 1966. Another description of the same apparatus appears in the October 1966, IEEE Proceedings, volume 54, page 1429.

In this arrangement, transducer 33 is in actuality a transducer assembly composed of a plurality of individual transducers 40, 41, 42 and 43 disposed laterally adjacent one to the next and from one to the next spaced in the direction of sound propagation by one-half the wavelength at the center of the range of frequencies through which the sound is varied. Additionally, transducers 40–43 are so coupled to signal source 35 that adjacent ones of the transducers are instantaneously energized in phase opposition. Source 35 is matched to the transducer assembly by the series combination of an inductor 44 and a capacitor 45 with that combination and source 35 coupled across a portion of an inductor 46 across which, in turn, the transducer assembly is coupled.

As indicated, the purpose of utilizing a transducer assembly composed of a plurality of individual transducers arranged and energized as just described is to cause the resulting composite sound wave fronts to tilt away from the position illustrated in FIG. 2 as the sound frequency changes so as to maintain more optimum angular orientation relative to the incoming light beam and thereby fully and efficiently diffract the light beam throughout the deflection sweep range. Instead of staggering the individual transducers in the direction of sound propagation as illustrated, they may also lie in a single plane and be individually energized by respective different phasing networks.

Figures 14, 16:
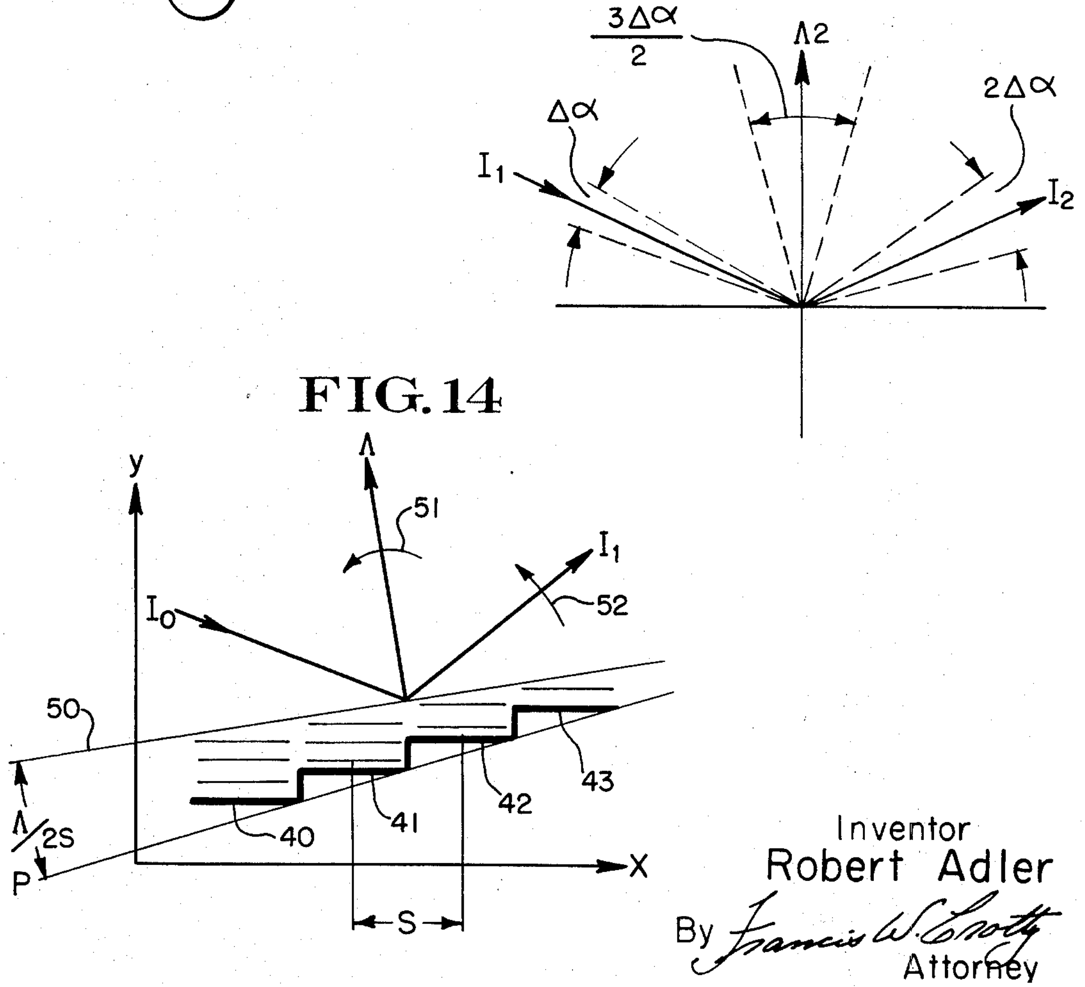

Since the operation of the phased array of transducers is completely described in the last-mentioned application and in the referenced articles, it will suffice for present purposes to present but a brief summary of its operation. The series of transducers 40–43 may be likened to a series of steps each of which is driven separately by an individual transducer. Adjacent transducers are driven in opposite phase. The height of the steps is so chosen that, at the center frequency $f_o$, the acoustic wave front 50 produced by all the transducers working together is parallel to the $x$-axis of FIG. 14. Because of the 180° phase shift between adjacent transducers, the steps are $\Lambda_o/2$ high. The slope of a plane P which grazes all steps is, therefore, $\Lambda_o/2s$, where $s$ is the width or the center-to-center spacing of the steps. When the applied frequency $f$ departs from center frequency $f_o$, the acoustic wave fronts 50 tilt in such a manner as to maintain an angle $\Lambda/2_s$ with respect to plane P. This is illustrated in FIG. 14 which is drawn for the condition $f>f_o$.

With a beam of light $I_o$ introduced under an angle $\lambda/^2\Lambda_o$ to the $x$-axis, the correct Bragg relationship exists at the center frequency where wave fronts 50 are parallel to that axis. The total angle between incident beam $I_o$ and plane P is $\lambda/2\Lambda_o+\Lambda_o/2s$. As the frequency increases, the acoustic wavefronts turn to the left as indicated by arrow 51 and the angle betwen wave fronts 50 and incident beam $I_o$ increases. To make this increase equal to the increment in the Bragg angle, the following relationship should be satisfied:

$$d\left(\frac{\lambda}{2\Lambda}+\frac{\Lambda}{2s}\right)=0 \qquad (6)$$

This condition is met at $f_0$ when the spacing $s$ is equal to $\Lambda_0^2/\lambda$.

Because the Bragg angle is proportional to frequency while the angle of the acoustic wave fronts is inversely proportional to frequency, the correction is perfect only at the center frequency $f_o$. At other frequencies, the angle which the light forms with the acoustic wavefront is too small by the value $\delta^2\alpha$, where $\alpha$ is the correct Bragg angle and $\delta$ is the fractional frequency deviation $(f-f_0)/f_o$. Because the error is always in one direction, the usable frequency range can be widened by a factor of $\sqrt{2}$ by choosing a compromise position for incident beam $I_o$. That is, by turning the incident light beam away from the acoustic wave front by the maximum permissible error, the limit of $\delta^2$ is doubled and two frequencies exist where the correction is perfect. In any event, rotation of the direction of sound propagation as indicated by arrow 51, as the sound frequency is swept throughout the scanning range and as the emerging beam $I_1$ likewise rotates as indicated by arrow 52, yields a substantial degree of correction.

Figure 15:
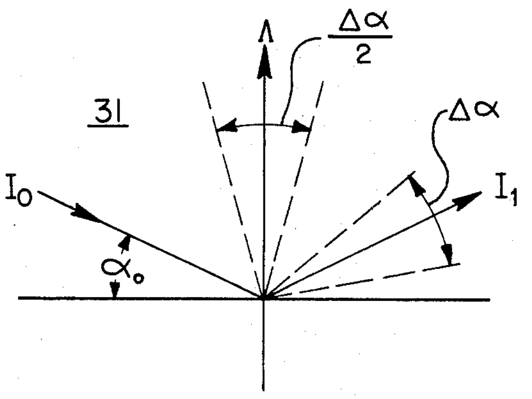
FIGS. 14–16 are diagrams helpful in understanding the systems and apparatus discussed with respect to FIGS. 11 and 13.

As shown in FIG. 15, for an incident beam $I_o$ defining an angle of $\alpha_o$ with the sound wavefronts, the emerging light beam $I_1$ is deflected through an angle $\Delta\alpha$ as the sound frequency is swept throughout the scanning range. In order to obtain proper and efficient response of the Bragg diffraction over the scanning range, the steering of the direction of sound wave propagation should be over an angle $\Delta\lambda/2$. This, then, is the preferred manner of operation of cell 31 in FIG. 11. Similarly, the second cell 32 is also arranged to effect steering of the acoustic waves propagating therein. For this purpose, the same step-transducer arrangement of FIG. 13 may be used except as modified in order to increase the amount of acoustic-propagation-direction steering.

That is, to obtain sufficient Bragg diffraction over the scanning range, the acoustic propagation direction in cell 32 should vary as shown in FIG. 16 in order to compensate for the change in acoustic wave frequency throughout the scanning range while at the same time also compensating for the deflection of beam $I_1$ emerging from cell 31. As indicated in FIG. 16, beam $I_1$ is incident upon the acoustic wave front, propagating in a direction $\Lambda_2$, at an angle which varies throughout the scanning range by an amount $\Delta\alpha$. As a result of again being diffracted by the acoustic waves, the light emerging from cell 32 as beam $I_2$ is now deflected over a range $Z\Delta\alpha$. In order, then, to provide the total compensation required, the acoustic wave propagation direction is steered through an angle of $3/2(\Delta\alpha)$.

Conveniently, such increased steering angle in cell 32 is obtained by decreasing the lateral step spacing $s$ while correspondingly increasing the number of steps as compared to cell 31. As derived above from Equation 6 with respect to cell 31, the step spacing in that cell is given by the relationship $s=\Lambda_0^2/\lambda$. An analogous derivation with respect to cell 32 yields an expression for the step spacing in that cell in accordance with the relationship $s=\Lambda_0^2/3\lambda$. In other words, for the same overall width of the transducer assemblies in the two cells, there should be three times as many steps in the second or downstream cell.

For computation of the amplitude response $m$ of the cells, a general expression is:

$$m=\left(\frac{\sin \pi G}{\pi G}\right)^2 \qquad (7)$$

where G is equal to the quantity $EL/\Lambda$, L is equal to the overall width of the composite sound or acoustic wave fronts and E represents the error from optimum Bragg relationship when the sound or acoustic wavelength departs from a wavelength in the center of the scanning frequency range. From a further analysis of FIG. 14 in the manner of the derivation of the Equation 6, it can be shown that, for cell 31, that error is expressed:

$$E=\alpha_o\frac{(f_o-f)^2}{f_of} \qquad (8)$$

By a similar analysis, it can be shown that, for cell 32, the expression for the angular error is:

$$E=3\alpha_o\frac{(f_o-f)^2}{f_of} \qquad (9)$$

Thus, the error in the downstream cell is three times that in the other.

In a practical application of the foregoing, wherein it was desired to double the resolution of a 28-megahertz center-frequency scanning cell having a 60% bandwidth, the transducer assembly of cell 31 had 4 steps each 0.256 inch wide and 0.004 inch high; thus, composite sound wave width L was 26 millimeters. On the other hand, cell 32 included a transducer assembly having 12 steps each 0.085 inch wide and 0.004 inch high for the same total width L of 26 millimeters. With both of the cells oriented for perfect Bragg angle relationship at center frequency $f_o$, the response of cell 31 was down .56 db and that of cell 32 was down 3.9 db at the 60% bandwidth points. Moreover, by slightly tilting the cells so that the Bragg relationship error at center frequency $f_0$ was the same as that at the 60% bandwidth points, the response of cell 31 was down but 0.13 db and that of cell 32 was only 0.915 db at the edges of the band. Consequently, in practice, the response may be made quite flat, corresponding to very little loss in efficiency throughout the scanning range.

As a point of caution in practice, it should be noted that typical diffraction cells are less than 100% efficient. As a result, some of the light incident upon cell 32 is not diffracted by that second cell although it is deflected through an angular range by the first cell. Consequently, the maximum deflection angles obtainable by the tandem arrangement of the two cells is limited by the necessity of avoiding overlap between the desired beam, which is diffracted by the downstream cell, and the other beam which is not. For the stepped-array transducer approach herein discussed, it can be shown that the maximum permissible bandwidth is about 66% before the occurrence of overlap between the beam that is diffracted only by cell 31 and the desired beam that is diffracted in each of the cells.

In order most clearly to illustrate the desired angular orientation between the propagation directions in cells 31 and 32 as well as the preferred relationship between the amounts of angular rotation of the propagation directions in the two different cells, they have been discussed and illustrated in FIG. 11 as constituting two separate devices. In practice, however, it is preferred to launch the two separate trains of sound or acoustic waves in a single propagating medium, such as water, in order to avoid unnecessary reflections of the light. Still in that case, each of the wave trains is generated by a separate array of transducers or other steerable transducing arrangement and all transducers preferably are driven from a common electrical source.

Moreover, the principles discussed permit the attainment of even greater deflection angles, with a corresponding further increase in resolution, by including still additional sound cells that successively intercept the light beam at the Bragg angle. Each of these additional cells may be represented in function by FIG. 16, letting the incoming deflection angle $\Delta\alpha$ shown in that figure correspond to the outgoing deflection angle of the light from the cell disposed immediately up-beam. The succession of acoustic wave trains are repetitively scanned in frequency indentically or commonly through the same range of frequencies, as by being coupled in common to source 35, and the cells may be respectively denoted 1, 2, 3 . . . R. Together, the plurality of wave trains cumulatively deflect the beam R times the deflection angle $\Delta\alpha$ effected by the first wave train. Each of the wave trains has its propagation direction steered through an angle in correspondence with the scanning function and compensating for the steering effected by all cells preceding it. The respective steering angles of the different wave trains are, therefore, $$\Delta\alpha\left(\frac{1}{2}, \frac{3}{2}, \frac{5}{2} \cdot \cdot \cdot \cdot \frac{2R-1}{2}\right)$$

It has thus first been shown that a wide aperture advantageously may be utilized in a practical light beam deflection system. With linear scanning of the sound frequency, the linear variation of the Bragg angle across the light aperture is equivalent to a simple convergent or divergent cylinder lens and the latter may be compensated either by optics or by a second compensatory light-sound interaction element.

It also has been shown that the utilization of the second light-sound interaction element in the light beam path enables not only a doubling of the angular light deflection but also permits a similar increase in the number of resolvable spots in a resulting image line as the beam is scanned across an image plane. This contrasts with the use of a telescope or other optical means which will expand the size of the deflection angle but which will not result in any improvement in resolution.

In connection with the attainment of a high efficiency of diffraction over a substantial bandwidth, the arrangement contemplates the use of steering of the wave propagation directions and the incorporation into the system, utilizing two or more light-sound interaction cells in series, of appropriate angular relationships between such steering in each of the cells. In consequence, the deflection angle is maximized as is the resolution, while a high degree of diffraction efficiency is exhibited over the entire scanning range.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. Light deflection apparatus comprising:
means for producing a beam of substantially monochromatic light along a path;
means for directing a first train of acoustic waves at an angle across said path effecting Bragg diffraction of the light in said beam;
means for directing a second train of acoustic waves at an angle across said path again effecting Bragg diffraction of said light:
and means for repetitively scanning the frequencies of said waves in both trains hrough respective ranges of frequencies mutually correlated in accordance with a predetermined function.

2. Apparatus as defined in claim 1 in which the frequencies of said waves each change across the width of said beam with said first train of waves having a predetermined refractive power for said light and with said second train of waves having a refractive power for said light complementary to the refractive power of said first train of waves.

3. Apparatus as defined in claim 2 wherein the frequencies of both of said wave trains increase with time during the scanning periods but said trains individually traverse said light beam in opposite directions, the propagation direction of said wave trains forming an angle approximately equal to twice the complement of the Bragg angle corresponding to the average frequency of said light and said acoustic waves.

4. Apparatus as defined in claim 3 wherein both said wave trains are derived from a common source.

5. Apparatus as defined in claim 2 wherein the frequency of one of said wave trains decreases and of the other increases with time during the scanning period and they individually traverse said light beam in opposite directions.

6. Apparatus as defined in claim 5 wherein the propagation directions of said wave trains are approximately parallel and the respective frequencies are sufficiently close as to cross over during scanning.

7. Apparatus as defined in claim 5 wherein the respective frequencies of said wave trains do not cross over during the scanning and one of said wave frequencies is heterodyned from the other.

8. Apparatus as defined in claim 7 wherein the lower-frequency one of said waves traverses said light beam downstream from the other.

9. Apparatus as defined in claim 8 wherein the propagation directions of said wave trains form an angle in accordance with the Bragg relationship corresponding to the center frequencies of the respective frequency ranges over which the frequencies are scanned.

10. Apparatus as defined in claim 1 in which said beam approaches said first wave train at a predetermined angle in which the paths of said wave trains define an angle approximately equal to twice said predetermined angle.

11. Apparatus as defined in claim 1 in which said wave trains traverse said beam generally in the same direction and said frequencies and ranges are identical.

12. Apparatus as defined in claim 1 in which the propagation direction of said first wave train changes generally in correspondence with changes in its frequency and the propagation direction of said second wave train changes generally in correspondence with both the changes in its frequency and the changes in propagation direction of said first wave train to maintain said Bragg diffractions throughout the scanning interval.

13. Apparatus as defined in claim 12 in which, during each scanning interval, said beam is deflected by said first wave train through a predetermined angle, said first-wave-train propagation direction is steered through an angle approximately one-half said predetermined angle, and said second-wave-train propagation direction is steered through an angle approximately three-halves said predetermined angle.

14. Apparatus as defined in claim 12 in which said wave trains are launched by respective phased arrays of transducers laterally spaced across the widths of the corresponding waves with the number of transducers in the array launching said second wave train being three times the number of transducers in the other array.

15. Light deflection apparatus comprising:

means for producing a beam of substantially monochromatic light;

means for developing a plurality of acoustic wave trains, respectively denoted 1, 2, 3 . . . R, successively intercepting said beam substantially at the Bragg angle and cumulatively deflecting said beam R times the deflection angle $\Delta\alpha$ effected by the first of said wave trains;

means for repetitively scanning the frequencies of all of said waves commonly through a predetermined range of frequencies;

and means included in said developing means for steering the propagation direction of each of said wave trains through an angle in correspondence with said scanning, the respective steering angles of said wave trains being $$\Delta\alpha\left(\frac{1}{2}, \frac{3}{2}, \frac{5}{2} \ldots \frac{2R-1}{2}\right)$$

References Cited

UNITED STATES PATENTS

| | | |
|---|---|---|
| 3,055,258 | 9/1962 | Hurvitz. |
| 3,399,013 | 8/1968 | Aas et al. |

RONALD L. WIBERT, Primary Examiner

E. BAUER, Assistant Examiner

U.S. Cl. X.R.

350—162